Patented Dec. 14, 1948

2,455,911

UNITED STATES PATENT OFFICE 2,455,911

SELF-CURING POLYCHLOROPRENE COMPOSITIONS

Louis S. Bake, Penns Grove, N. J., assignor to E. I. du Pont de Nemours & Company, Wilmington, Del., a corporation of Delaware No Drawing. Application August 18, 1947, Serial No. 769,328

3 Claims. (Cl. 260—79)

This invention relates to improvements in the manufacture of self-curing polychloroprene compositions. By "self-curing" is meant the ability of the polychloroprene to cure (vulcanize) at room temperatures without the application of heat.

For years cement manufacturers have been searching for the ideal room temperature accelerator for rubber and synthetic polymer rubber solutions. By ideal is meant that the accelerator will have no effect on the solution but will act rapidly on the film after application of the solution and the evaporation of the solvent. With natural rubber, some degree of success has been attained by the use of additives to the solution. For example, nitro-propane will, under some conditions, tend to inhibit the gelation of a natural rubber cement. When the solution is applied, the effect of the nitro-propane is lost because of its evaporation, and the accelerator thus becomes active and vulcanization of the dried film occurs.

In the use of adhesive cements, it is often desired to vulcanize the adhesive film in order to obtain the best possible cohesive strength. This can be done in most cases by the application of heat which is both expensive and time-consuming. In other cases, the materials bonded are of such a shape and size that no convenient method of applying heat is available. In still other cases, the materials being bonded are of such a composition that they are deteriorated by the heat necessary for vulcanization of the cement.

With polychloroprene dipped goods it would be advantageous to cure the dipped film without the application of heat. To accomplish this it is necessary to add a room temperature accelerator to the dipping cement. Prior to this invention such a technique was not possible because no room temperature acceleration was known which would not gel the cement in the dipping tank in a relatively short time, thus spoiling excessive quantities of cement.

In the coating of fabric with polychloroprene cements, it is customary to apply the cement by a spreader to a continuous roll of fabric. The coated fabric is passed through a drying oven and rolled up and must then be passed through a curing oven to vulcanize the coating. It can readily be seen that a great saving in time and money would result if the coated fabric after drying was simply rolled up and allowed to self-vulcanize in the roll.

While it is known that the xanthates will effect a cure in natural rubber at room temperature and that zinc butyl xanthate has been used for this purpose, it is also well known that the zinc butyl xanthate, while it will cure films deposited from natural rubber cement if it is added to the cement before the time of application, will gel the cement in a comparatively short period of time, thus rendering it unfit for further use.

It is therefore an object of this invention to provide self-curing polychloroprene compositions particularly useful in the manufacture of self-curing polychloroprene cements, or polychloroprene films which are deposited from solutions of the polychloroprene, which cure rapidly at room temperatures upon evaporation of the solvent and which on curing have good cohesive strength.

It has been found that heavy metal xanthates, when added to a polychloroprene cement in an amount equal to from 1% to 10%, based on the weight of the polychloroprene employed in the cement, have little or no adverse effect on its stability, but when the cement is applied to a surface and allowed to dry, the dried film deposited will cure at room temperatures in a comparatively short period of time. This is a very unusual reaction for which we have no sound explanation.

Any of the heavy metal xanthates may be employed, such as zinc, cadmium, lead, iron, nickel, mercury, chromium, etc. Any of the xanthates made from alcohols containing from 1 to 8 carbon atoms may be used, such as methyl, ethyl, propyl, butyl, amyl, hexyl, heptyl and octyl alcohol. When the metals employed are polyvalent metals, the xanthate radicals may contain the same or different alkyl groups. The zinc xanthates are preferred, particularly zinc butyl xanthate.

The polychloroprene to which the present invention is particularly adapted is the soluble polychloroprene type ordinarily employed in the preparation of cements by dissolving the same, prior to curing or vulcanization, in organic solvents such as toluene, etc. The sulfur-modified type, such as described in U. S. Patent 2,234,215, and those wherein the polymerization is modified by the use of mercaptans such as described in U. S. Patent 2,227,517, are typical illustrations of the type of polychloroprene to which this invention relates. Other soluble types, such as produced by polymerization in the presence of other modifying agents and which may be employed in the preparation of cements, may be rendered self-curing by this invention.

In the following tables are listed data which illustrate the stability of polychloroprene cements containing xanthates and the rapidity with which the dried films deposited therefrom will cure at room temperature.

The stabilities of the cements were determined by allowing them to age at a room temperature of 28° C. (82° F.) and at an elevated temperature of 70° C., and noting the time required for them to gel and become unfit for use.

The speed of cure was found by determining the cohesive strength at 60° C. of films used to adhere two strips of cotton fabric after allowing the bonded strips to age for various periods of time at 28° C. The cohesive strengths were determined by stripping the combined strips apart in a Scott Tensile Testing Machine. Where the cohesive strength of the film was greater than the adhesion of the film to the fabric with the result that the material was stripped from the fabric itself, this value is given in each of the tables and identified as such.

Because uncured polychloroprene films are thermoplastic, the strength of a polychloroprene film at 60° C. (the temperature of test) is comparatively low. As the cement film becomes vulcanized (cured), spontaneously or with the application of heat, the thermoplasticity decreases and the cohesive strengths of the film become greater. If a polychloroprene cement contains no accelerator, the deposited film does not tend to cure upon aging at room temperature, and, when tested at 60° C., the cohesive strength of the film does not increase as the aging proceeds. If, however, a fast curing accelerator is present in the film, it will progressively cure on aging at 28° C. and the cohesive strength determined at 60° C. will become progressively greater until the film is fully cured, after which further aging at 28° C. will result in no further increase in bond strength.

We are concerned primarily with the cohesive strength of the film itself. The adhesion of the cement to the fabric is not a particular factor in the present invention.

In the following examples, the parts used are by weight unless otherwise specified.

TABLE I

*The effect of various xanthates in polychloroprene at room temperature*

Base cement

| | Parts |
|---|---|
| Polychloroprene (mercaptan modified, made at low temperature) | 100 |
| Toluene | 400 |

| Base Cement plus 4% of (Based on Polychloroprene) | Hours Aged at 28° C. Before Testing | |
|---|---|---|
| | 16 hours | 72 hours |
| | Cohesive Strength of Film at 60° C. in lbs./in. | |
| Control | 6 | 6 |
| Zinc butyl xanthate | ¹ 15 | ¹ 18 |
| Cadmium butyl xanthate | 7 | 12 |
| Zinc ethyl xanthate | 7 | 9 |
| Lead butyl xanthate | 7.5 | 9 |
| Zinc amyl xanthate | 11 | ¹ 18 |
| Zinc propyl xanthate | 7 | 15 |
| Zinc methyl xanthate | 8 | 10 |

¹ The cohesive strength of film was greater than adhesion to fabric—adhesion to fabric measured.

It should be noted that the control which contains no xanthates did not increase in strength (measured at 60° C. after 72 hours' aging at 28° C., showing that during this aging period no cure had taken place.

All of the samples illustrated in the above table which contained xanthates showed some increase in strength after only 16 hours' aging at 28° C., while with some of the xanthates a considerable increase was obtained in this short aging period. When the aging period was increased to 72 hours, all cements containing the xanthates increased substantially in cohesive strength.

Zinc butyl xanthate appears from the results obtained to cure polychloroprene at a more rapid rate than any of the other xanthates.

To illustrate further the effect of xanthates on other soluble types of polychloroprene, additional tests were made using cements accelerated with zinc butyl xanthate. The results obtained are listed in Table No. 2.

TABLE II

*The effect of zinc butyl xanthate*

| Base Cement | No. 1 | No. 2 |
|---|---|---|
| | Parts | Parts |
| Polychloroprene (Sulfur modified) | 100 | 100 |
| Whiting | | 10 |
| Toluene | To make 25% solutions. | |

| | Days Aged at 28° C. before Test | | |
|---|---|---|---|
| | 1 day | 2 days | 3 days |
| | Cohesive Strength of Films at 60° C. in lbs./in. | | |
| Base Cement No. 1 | 2.0 | 3.5 | 2.0 |
| Base Cement No. 2 | 0.5 | 3.5 | 2.0 |
| Base Cement No. 1+4% zinc butyl xanthate (based on polychloroprene) | 16 | ¹ 20 | ¹ 18 |
| Base Cement No. 2+4% zinc butyl xanthate (based on polychloroprene) | 18 | 19 | 20 |

¹ The cohesive strength of the film was greater than the adhesion to the fabric with the result that values listed represent adhesion rather than cohesion.

These results are even more striking than those listed in Table I, probably because of the lower inherent strength of the polymer used in preparing the cements.

In spite of the rapid self-curing of the dried films of polychloroprene containing the heavy metal xanthates, the corresponding cements are, in general, no less stable than the cements without the xanthates. The stabilities were followed by determining the viscosities and the gelation, if any, of cements in Gardner-Holdt bubble tubes after various aging periods at both 28° C. and 70° C., using cements containing no pigments or pigments such as magnesium and zinc oxides which tend to decrease stability. In the case of a cement containing zinc oxide alone, zinc butyl xanthate actually increased the stability from 2 days to more than 21 days. It is therefore possible and practical to sell polychloroprene cements containing a xanthate which does not become active until the cement has been applied and the solvent allowed to evaporate, instead of adding a curing agent just before the cement is used, as was previously necessary.

Further evidence of the effect of zinc butyl xanthate on the cure of dry polychloroprene compounds is shown by the fact that, if zinc butyl xanthate is milled into a dry polychloroprene compound, the compound becomes cured and will not dissolve in solvents. The xanthates should, therefore, be added as a slurry or in any other convenient manner to the cement itself, and not incorporated directly into the solid polychloroprene.

A pronounced acceleration in the cure of the polychloroprene is obtained, without experiencing undesirable gelation of the solution, when from 1% to 10% of the metal xanthate is employed in the solution.

Suitable solvents for making the cements and solutions of the polychloroprene of this invention are those ordinarily employed in making solutions of polychloroprene, and particularly those disclosed in U. S. Patent 1,967,863, page 2, lines 4 et seq. These solvents and solvent mixtures may often be advantageously diluted with refined petroleum distillates and other aliphatic hydrocarbons, as described in that patent. The solvents usually employed are inert volatile organic solvents in which the polychloroprene is soluble and which readily evaporate at room temperatures when spread in relatively thin films. A polychloroprene concentration between 15% and 30% is usually preferred in making the cements, although the present invention is also applicable to more and less concentrated dispersions. Other materials commonly used in cements, such as antioxidants, pigments and fillers, may of course be added.

This invention is applicable to the preparation of polychloroprene rubber cements in which the polychloroprene alone is employed, or as a copolymer with minor amounts of other polymerizable compounds.

I claim:

1. A relatively rapid, low temperature-curing polychloroprene composition comprising a volatile organic solvent solution of the polychloroprene containing from 1% to 10%, based on the weight of the polychloroprene, of a heavy metal xanthate derived from an unsubstituted aliphatic alcohol containing from 1 to 8 carbon atoms.

2. A relatively rapid, low temperature-curing polychloroprene composition comprising a volatile organic solvent solution of the polychloroprene containing from 1% to 10%, based on the weight of the polychloroprene, of a zinc xanthate derived from an unsubstituted aliphatic alcohol containing from 1 to 8 carbon atoms.

3. A relatively rapid, low temperature-curing polychloroprene composition comprising a volatile organic solvent solution of the polychloroprene containing from 1% to 10%, based on the weight of the polychloroprene, of zinc butyl xanthate.

LOUIS S. BAKE.

No references cited.